(12) United States Patent
Dramlitsch

(10) Patent No.: US 7,823,923 B2
(45) Date of Patent: Nov. 2, 2010

(54) METHOD OF ESTABLISHING BELT PULLOUT IN AN OCCUPANT RESTRAINT SYSTEM FOR VEHICLES AND AN OCCUPANT RESTRAINT SYSTEM FOR VEHICLES

(76) Inventor: Thomas Dramlitsch, Claudiusstrasse 3, Berlin (DE) 10557

( * ) Notice: Subject to any disclaimer, the term of this patent is extended or adjusted under 35 U.S.C. 154(b) by 511 days.

(21) Appl. No.: 11/632,464

(22) PCT Filed: Jul. 12, 2005

(86) PCT No.: PCT/EP2005/007723

§ 371 (c)(1),
(2), (4) Date: Jan. 12, 2007

(87) PCT Pub. No.: WO2006/008084

PCT Pub. Date: Jan. 26, 2006

(65) Prior Publication Data

US 2007/0256876 A1 Nov. 8, 2007

(30) Foreign Application Priority Data

Jul. 15, 2004 (DE) .................. 10 2004 035 486

(51) Int. Cl.
*B60R 22/00* (2006.01)
*B60R 22/28* (2006.01)
*B60R 22/40* (2006.01)

(52) U.S. Cl. .................. 280/805; 280/801.1; 280/806; 180/268; 242/379.1; 242/384; 297/475; 297/480

(58) Field of Classification Search ................. 180/268; 280/801.1, 805–807; 297/470, 471, 479, 297/475, 477, 480; 242/379.1, 382.4, 384

See application file for complete search history.

(56) References Cited

U.S. PATENT DOCUMENTS

| | | | | |
|---|---|---|---|---|
| 4,422,594 A | * | 12/1983 | Honl | 242/383.4 |
| 4,741,491 A | * | 5/1988 | Andersson et al. | 242/383 |
| 4,984,651 A | * | 1/1991 | Grosch et al. | 180/268 |
| 5,558,295 A | * | 9/1996 | Bauer | 242/379.1 |
| 6,290,159 B1 | * | 9/2001 | Specht et al. | 242/379.1 |
| 6,719,233 B2 | | 4/2004 | Specht et al. | |
| 6,737,819 B2 | * | 5/2004 | Tanji | 318/3 |
| 6,863,308 B2 | * | 3/2005 | Motozawa | 280/806 |
| 7,029,033 B2 | * | 4/2006 | Tobata | 280/807 |
| 2004/0060762 A1 | * | 4/2004 | Tobata | 180/268 |
| 2004/0066027 A1 | * | 4/2004 | Ingemarsson | 280/805 |
| 2004/0108155 A1 | * | 6/2004 | Mori et al. | 180/268 |

FOREIGN PATENT DOCUMENTS

| | | |
|---|---|---|
| DE | 2 215 892 | 10/1973 |
| DE | 196 04 483 | 3/1997 |
| EP | 1 350 697 | 10/2003 |
| WO | WO 02062631 A1 * | 8/2002 |

* cited by examiner

*Primary Examiner*—Paul N Dickson
*Assistant Examiner*—James English
(74) *Attorney, Agent, or Firm*—Gerald E. Hespos; Michael J. Porco

(57) ABSTRACT

A method of establishing belt pullout in an occupant restraint system for vehicles with a safety belt includes the steps: detecting the vehicle acceleration, and establishing the belt pullout in dependence on the detected vehicle acceleration.

13 Claims, 1 Drawing Sheet

METHOD OF ESTABLISHING BELT PULLOUT IN AN OCCUPANT RESTRAINT SYSTEM FOR VEHICLES AND AN OCCUPANT RESTRAINT SYSTEM FOR VEHICLES

BACKGROUND OF THE INVENTION

1. Field of the Invention

The present invention concerns a method of establishing belt pullout in an occupant restraint system for vehicles and an occupant restraint system for vehicles.

2. Description of the Related Art

Modern motor vehicles are equipped with a series of active and passive safety systems. In that respect active safety systems intervene directly in the driving characteristics of the vehicle while passive safety systems are intended to ensure protection for the occupants from injury in the event of an accident. Active safety systems are for example the anti-locking system for brakes or electronic driving dynamics regulation. Passive safety systems include for example vehicle zones which in the event of an accident are subject to defined deformation (so-called crumple zones). An important group of passive safety systems is represented by the occupant restraint systems. They provide for minimising the risk of injury to occupants in the event of an accident, for example by means of safety belts and/or inflatable impact bags, referred to as airbags.

Safety belts are intended to prevent the body of a vehicle occupant being thrown excessively far forward during an accident and for example hitting against the steering wheel. Modern safety belts are fitted with belt pretensioners which in the event of an accident pull the belt taut and lock it in order to reliably prevent uncontrolled forward displacement. If however the restraint action of the belt is excessively strongly pronounced, the belt itself can cause a loading on the occupant to be restrained, and that loading can give rise to injuries. Such injuries can occur for example in the chest region of the occupant.

In order to avoid injuries due to the belts, force limiters are therefore installed in modern vehicles, which in the case of an accident limit the force acting between the belt and the vehicle occupant by allowing a defined belt pullout which is defined by way of a given force-travel relationship. The force-travel relationship is for example such that pullout of the belt is prevented until the force operative between the belt and the vehicle occupant reaches a predetermined force which is generally about 4 kN. When that force is reached defined belt pullout then takes place in such a way that the force acting on the occupant does not exceed the predetermined force.

The described force limiters are generally designed for standardised vehicle occupants, referred to as 50%-ers. A 50%-er is a person who is 1.80 m tall and weighs 75 kg. Height and weight of such a person correspond to a person who represents precisely the average of the population, that is to say one half of the population is taller and heavier and the other half is shorter and lighter. In the event of an impact against a rigid wall at 56 kph (35 mph) the described force limiter provides that the defined belt pullout allows a forward displacement of a 50%-er in a direction towards the steering wheel of about 30 cm.

If however the vehicle occupant is not a 50%-er but for example a 5%-er female, that is to say a female of a body weight of about 50 kg and 1.50 m tall (that is to say only 5% of all females are shorter and lighter), the force limitation at a value of 4 kN is not appropriate to keep the loading caused by the belt within tolerable limits.

In order to keep the loading caused by the belt tolerable for vehicle occupants of different heights and different body weights, for example DE 196 04 483 C1 proposes detecting the body data of a vehicle occupant and ascertaining the belt pullout allowed by the force limiting device, on the basis of the detected body data. However the operation of ascertaining the body data of a vehicle occupant is complicated and is not always reliable.

Therefore the object of the invention is to provide a method of establishing belt pullout in an occupant restraint system for vehicles, with which in the event of an accident the loading on a vehicle occupant by the safety belt can be limited substantially independently of the body data of the occupant.

A further object of the present invention is to provide an occupant restraint system for vehicles, with which in the event of an accident the loading on a vehicle occupant by the safety belt can be limited substantially independently of the body data of the occupant.

SUMMARY OF THE INVENTION

The method according to the invention of establishing belt pullout in an occupant restraint system for vehicles with a safety belt involves detecting the vehicle acceleration and establishing, advantageously directly establishing, belt pullout in dependence on the detected vehicle acceleration. The distance by which an occupant is displaced forwardly in the case of an accident then depends solely on the acceleration of the vehicle, which occurs in the accident. The forward displacement permits a movement of the occupant with respect to the vehicle and unlike the state of the art does not at any time depend on the force acting between the belt and the occupant. As a result, irrespective of the body weight of the occupant, it prevents an acceleration which exceeds the predetermined acceleration value being transmitted to the occupant. In the state of the art in contrast belt pullout is not established in direct dependency on vehicle deceleration but always depends on the prevailing belt force (or a prevailing belt pullout resistance) which in turn can be established in dependence on many variables.

The method according to the invention of establishing belt pullout is based on the realisation that the acceleration suffered by an occupant in the event of an accident, for example in the case of a frontal impact against a wall, represents a suitable measure in respect of the loading on the occupant. In this connection it should be pointed out that the term acceleration is to be interpreted as denoting any kind of change in speed. This therefore does not involve making the distinction used in colloquial language between acceleration and deceleration. Rather, in the context of the present description, the considerations here are to be based on a scientific concept of acceleration, that is to say deceleration is to be interpreted as negative acceleration. Equally we use 'establishing belt pullout' to denote establishing a belt pullout distance, as a man skilled in the art in the field of vehicle safety would interpret it. If for example the method according to the invention decides that, on the basis of the detected acceleration, the pullout is to be established at 42 mm, the occupant cannot pull out more than 42 mm of belt webbing, irrespective of the prevailing belt force, occupant weight or other parameters. That can be effected by suitable locking mechanisms as are shown by way of example in an embodiment of the restraint system according to the invention (see for example FIG. 2). In particular sensing of belt pullout is not absolutely necessary with the method according to the invention.

If now belt pullout is established in dependence on the detected vehicle acceleration instead of belt force, the acceleration transmitted to a vehicle occupant and thus the loading on the vehicle occupant can be limited in an accident. As a distinction in relation thereto, the methods of the state of the art in which belt pullout is established on the basis of the force acting on the belt provide that acceleration of the vehicle occupant to be restrained, in particular acceleration of the thorax of the vehicle occupant, is kept reliably within tolerable limits only for a given target group, namely the 50%-er.

The acceleration which a belt in accordance with the state of the art causes with predetermined force limitation in relation to the vehicle occupant depends on the body weight of the occupant. With a given force acting on the vehicle occupant, the acceleration of the occupant is obtained by dividing the force exerted by the belt and possibly other restraint systems on the occupant, by the body weight of the occupant. The lower the body weight of the occupant, the correspondingly higher in that respect is the acceleration caused by the force. In other words, the 5%-er female will experience a markedly higher level of acceleration than the 50%-er male, with a given force being transmitted by the belt. If now belt pullout is established by a force-travel relationship in which for example there is no belt pullout before the force transmitted by the belt exceeds 4 kN, then the 50%-er, at 4 kN, still experiences a considerable degree of acceleration while the acceleration for the 5%-er female exceeds the limit of what is tolerable. In contrast the method according to the invention ensures that, irrespective of the body weights of the occupants, the acceleration transmitted to the respective occupant can be kept within tolerable values. That can be achieved for example by belt pullout occurring only when the detected vehicle acceleration exceeds a predetermined acceleration value. The vehicle acceleration is then transmitted to the occupant to be restrained, only up to the predetermined acceleration value.

If the vehicle acceleration exceeds the predetermined acceleration value then belt pullout can be established for example by the amount by which the vehicle acceleration exceeds the predetermined acceleration value. In that respect it is possible, when the predetermined acceleration value is exceeded, to make the belt pullout such that the acceleration which rises above the predetermined acceleration value is not transmitted at all to the occupant to be restrained. Alternatively it is also possible, when the predetermined acceleration value is exceeded, for the difference value between the detected vehicle acceleration and the predetermined acceleration value to be passed to the vehicle occupant in part, for example in accordance with a given predetermined functional relationship. In that way it is possible to implement different belt pullout responses.

Particularly if the predetermined acceleration value represents the maximum vehicle acceleration which is to be passed on to the vehicle occupant to be restrained, the predetermined acceleration value should not exceed 60-times acceleration due to gravity (60 g). If the difference between the detected vehicle acceleration and the predetermined acceleration value is to be passed on in part to the vehicle occupant to be restrained, it is advantageous if the predetermined acceleration value is less than 60 g and preferably less than about 35 g.

Detection of the vehicle acceleration can be effected in the method according to the invention for example by means of a reference body of known mass, which is movable relative to the vehicle.

An occupant restraint system according to the invention for vehicles includes at least one safety belt allowing belt pullout, a blocking device for blocking belt pullout and a release device acting on the blocking device for definedly enabling belt pullout. In addition the occupant restraint system according to the invention includes an acceleration detection unit which detects vehicle acceleration and in dependence on the detected vehicle acceleration acts on the release device to define the defined enablement of belt pullout.

In particular the method according to the invention can be carried into effect with the occupant restraint system according to the invention. The acceleration which is transmitted to the occupant to be restrained is therefore limited not by the force exerted by the belt but by the actually detected vehicle acceleration. As the nature of belt pullout therefore does not depend on the body weight of the occupant to be restrained, the loading on vehicle occupants in the event of an accident can be limited with the occupant restraint system according to the invention, irrespective of their body weights.

In a possible configuration of the occupant restraint system the acceleration detection unit includes a reference mass which is movable relative to the vehicle and which is displaceable out of its position against a predetermined force and which acts on the blocking unit upon a change in position against the predetermined force as the release unit for enabling belt pullout. An acceleration detection unit of that kind can also be used in particular in systems in which the acceleration detection unit acts on the release device mechanically, that is to say by way of a mechanical coupling. A mechanical coupling can also be designed for example in the form of a redundant system, for example in conjunction with an electronic coupling, so that defined belt pullout is guaranteed even when the on-board electronics of the vehicle have failed because of the accident.

The force F holding the reference mass in position can be established for example by the formula F=B m g, wherein g is the acceleration due to gravity, m is the mass of the reference mass and B is a freely selectable parameter. If the freely selectable parameter is for example of the dimensionless value 60, that provides that the reference mass moves only when the detected vehicle acceleration exceeds a value of 60 g, that is to say 60-times the acceleration due to gravity. Therefore belt pullout occurs only if more than 60-times the acceleration due to gravity were to act on the occupant.

Further features, properties and advantages of the present invention will be apparent from the description hereinafter of an embodiment by way of example with reference to the accompanying Figures.

DETAILED DESCRIPTION OF THE PREFERRED EMBODIMENTS

Figure 1:
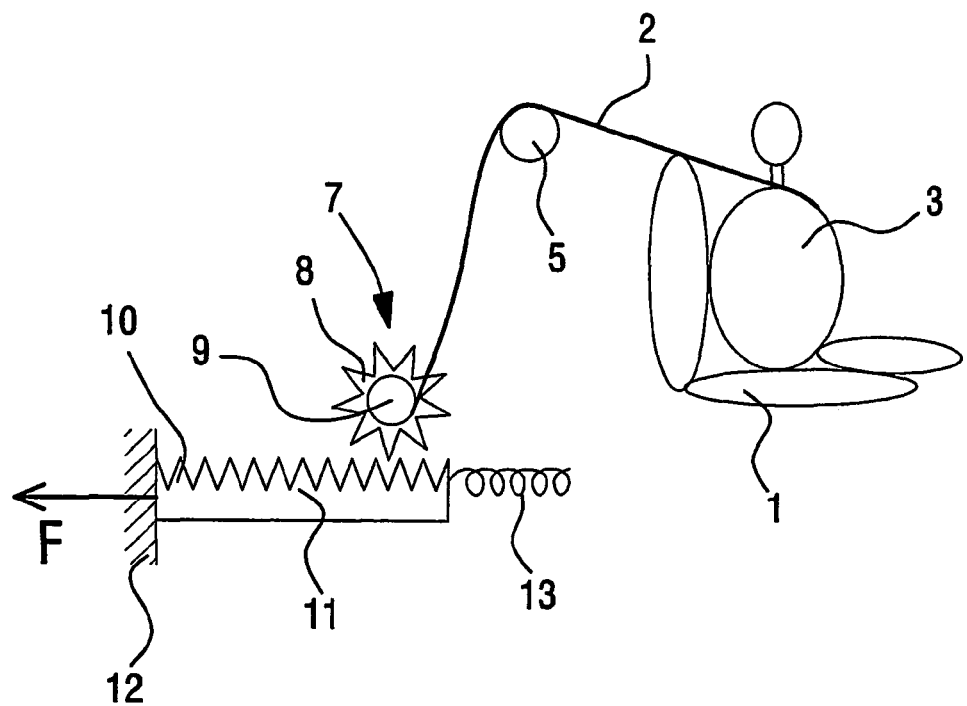
FIG. 1 shows a first embodiment of the occupant restraint system according to the invention in a highly diagrammatic view.

A highly diagrammatic view of an embodiment of the occupant restraint system according to the invention is shown in FIG. 1. FIG. 1 shows a vehicle seat 1, a restraint or safety belt 2 and a vehicle occupant 3 sitting on the vehicle seat 1, with the safety belt 2 fitted. The safety belt 2 is designed in such a way that, in the event of an accident, it is firstly tensioned and locked in order to hold the vehicle occupant 3 back in the seat. That prevents the occupant 3 being displaced forwardly in a direction towards the vehicle dashboard (not shown). Furthermore under given conditions the belt 2 allows belt pullout in order to prevent injury to the vehicle occupant 3 by the safety belt.

The safety belt 2 is deflected in a direction towards a blocking and release unit by way of a deflection device which is arranged in or at the B-pillar of the vehicle and which for example can be in the form of a deflection roller 5 or deflection stirrup.

The blocking and release unit 7 includes a retractor for rolling up the safety belt 2 and a plurality of gears of which only one gear 9 is symbolically illustrated in FIG. 1. The blocking unit 7 further includes a rack 11 which is of a predetermined mass m and which is fixed to the vehicle in such a way that it is held in position with a predetermined force F. The teeth 10 of the rack 11 are in contact with the teeth 8 of at least one of the gears 9 in such a way that the rack 11 blocks rotation of the gear 9 or the gears, as long as it remains stationary in its position. If in contrast a linear movement of the rack 11 takes place the linear movement is converted into a rotary movement of the retractor by virtue of the co-operation with the gear 9 so that unrolling of the safety belt 2 takes place and thus belt pullout is enabled.

In the present embodiment the predetermined force F with which the rack 11 of the mass m is held in position is given by the formula F=B m g, wherein g denotes the acceleration due to gravity and m denotes the mass of the rack 11. B represents a dimensionless parameter, the value of which can be freely selected. The predetermined force acting on the rack 11 can be embodied for example by a spring 13 which presses the rack 11 against a support portion 12 of the vehicle. The spring 13 prevents a movement of the rack 11 such as to enable belt pullout, and therefore forms the blocking unit for blocking belt pullout. The spring 13 and the support portion 12 are arranged in such a way that, in the case of a frontal impact, the acceleration of the rack 11, resulting from the frontal impact, exerts a force on the rack 11, which acts in the direction which is opposite to the direction of the predetermined force which holds the rack 11 in position. The force exerted on the rack 11 upon a frontal impact due to the acceleration involved is produced in that case from the product of the vehicle acceleration a which occurs and the mass m of the rack. The mass m of the rack 11 can therefore be viewed as an acceleration detection unit which detects the vehicle acceleration.

If the parameter B is for example of the dimensionless value 20, that signifies that the force holding the rack 11 in position is of a value which corresponds to 20-times the acceleration due to gravity (20 g) multiplied by the mass of the rack. If now the vehicle acceleration resulting from the frontal impact of the vehicle is less than 20 g, then the force resulting therefrom is less than the force which holds the rack 11 in position so that it is not sufficient to move the rack 11 out of its position. If the vehicle acceleration exceeds 20 g because of the impact however, the force resulting therefrom is greater than the force which holds the rack 11 in position. The rack 11 is therefore deflected out of its position and acts on the gear 9 or the gears to release belt pullout. For the vehicle occupant, that means that the belt remains locked as long as the vehicle acceleration does not exceed the value of 20 g by virtue of the impact. The safety belt 2 then substantially transmits all of the vehicle acceleration to the vehicle occupant 3. If however the vehicle acceleration exceeds the value of 20 g and assumes for example the value of 22 g, the rack 11 moves forwards at an acceleration of 2 g. The accelerated movement results in the belt pullout being enabled so that the vehicle acceleration transmitted to the occupant 3 remains limited to 20 g. In the present embodiment therefore the rack 11 represents the release unit for enabling belt pullout.

If for example the spring force F of the spring 13 is constant, then with a given vehicle deceleration a(t), the movement of the mass m and thus belt pullout s(t) is essentially described by the expression:

$$s(t) = \int_0^t \int_0^t \left(a(t) - \frac{F}{m}\right) dt\, dt.$$

As F and m are fixed values, belt pullout—as is required—depends solely on the vehicle deceleration a(t). With a given value (namely F/m) the deceleration of the occupant is thus kept constant and at no time depends on the belt force.

Unlike release devices in accordance with the state of the art therefore enablement of belt pullout is not based on a force-travel characteristic of the safety belt, but is determined solely by vehicle acceleration. The loading on the occupant in an accident therefore does not depend on the body weight of the occupant.

Figure 2:
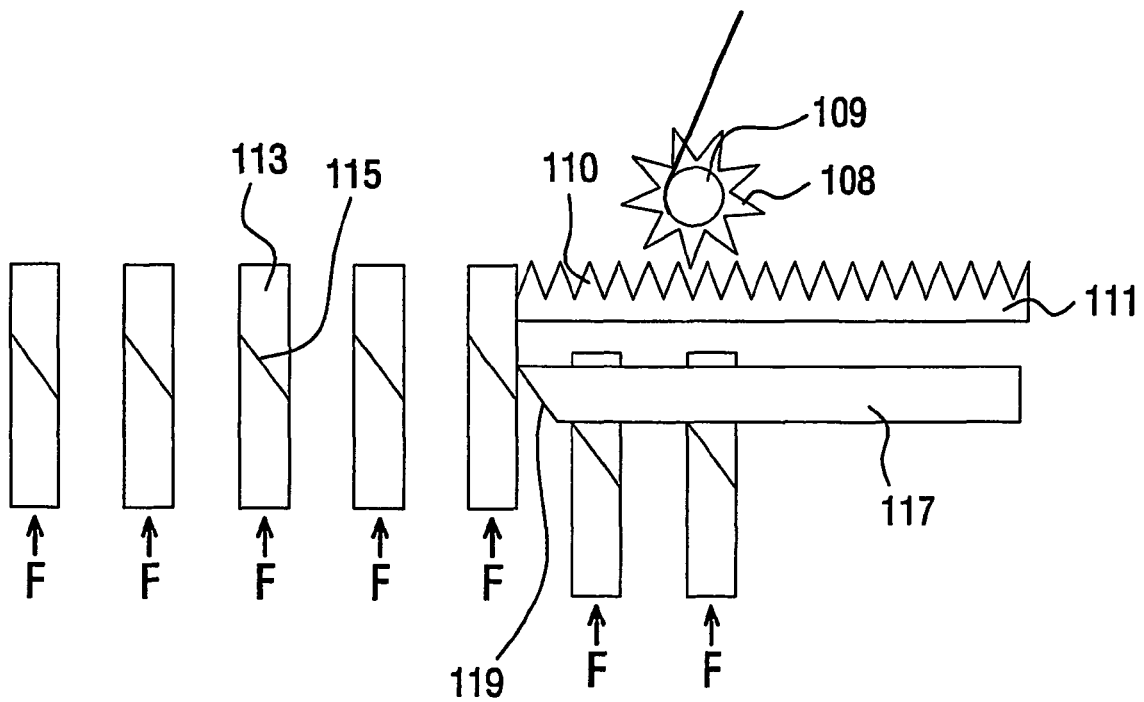
FIG. 2 shows a second embodiment of the occupant restraint system according to the invention in a highly diagrammatic view.

FIG. 2 shows a second embodiment of the occupant restraint system according to the invention. The blocking and release device includes at least one gear 109 which is coupled to a retraction reel for the safety belt and the teeth 108 of which are in engagement with the teeth 110 of a rack 111. In that case rotation of the gear 109 causes linear displacement of the rack 111. Likewise, linear displacement of the rack 111 causes a rotary movement of the gear 109. In addition the blocking and release device includes a number of abutment pins 113 which form abutments for blocking a movement of the rack 111 in a given direction of movement. The direction of movement of the rack 111 which is blocked by the abutment pins 113 corresponds in this case to that direction of movement which would result in a rotary movement of the gear 109, which would cause belt pullout. The abutment pins 113 thus block belt pullout. The abutment pins 113 are held in position with a predetermined force F and can be displaced out of their position against that force F. In the embodiment shown in FIG. 2 the force F holding the abutment pins 113 in position acts on the underside of the abutment pins 113.

The release device is formed by a reference body 117 in the embodiment shown in FIG. 2. The reference body 117 has at its front end an inclined surface 119 which is bevelled in such a way that, by co-operating with bevelled surfaces 115 of the abutment pins 113, it can displace the abutment pins 113 out of position against the force F. Displacement of an abutment pin 113 is only possible however when the force which is transmitted by the inclined surface 119 to the bevelled surface 115 of the pin 113 exceeds the force F holding the pins in position.

The reference body 117 is arranged relative to the abutment pins 113 in such a way that, in the case of a frontal impact, acceleration of the reference body 117 takes place in a direction which results in a transmission of force, dependent on the acceleration, to the bevelled surface 115 of an abutment pin 113. If that force exceeds the force F holding the corresponding abutment pin 113 in position, that abutment pin 113 is displaced out of its position and releases the movement of the rack 111, which permits belt pullout. In that case, the predetermined force F with which the abutment pins 113 are held in position is determined having regard to the mass of the reference body 117 which represents a reference mass, and the force which can be transmitted by the inclined surfaces 115, 117. The mass of the reference body thus represents an acceleration detection unit with which vehicle acceleration is detected.

If in the embodiment shown in FIG. 2 the acceleration is so high only for a short time that the abutment pins 113 can be displaced out of their position, firstly only that abutment pin 113 which was closest to the reference body 117 prior to the occurrence of the high acceleration is displaced out of its position. Depending on how long the acceleration is of the required level, further abutment pins 113 are displaced out of their position. As soon as the acceleration decreases again, those abutment pins 113 which until then had not yet been displaced out of their position, are also no longer displaced so that belt pullout is again blocked. If then a renewed high level of acceleration occurs, further abutment pins 113 can be displaced so that further belt pullout can occur.

The blocking devices and release devices illustrated in the specific embodiments only represent two examples of possible blocking and release devices. A man skilled in the art in the field of restraint systems will readily be able to find a large number of further implementations of the principle according to the invention for establishing belt pullout in dependence on the detected vehicle acceleration.

The invention claimed is:

1. A method of limiting an acceleration transmitted to an occupant by an occupant restraint system of a vehicle in case of an accident where the occupant restraint system comprises a safety belt that allows belt pullout, a blocking device for blocking the belt pullout and a release device for acting on the blocking device to enable a defined length of the belt to be pulled out, the method comprising in case of an accident the steps of:
   detecting the vehicle acceleration;
   defining a length of the belt greater than zero that is allowed to be pulled out based on the detected vehicle acceleration; and
   operating the release device and causing the release device to act on the blocking device for enabling the defined length of the belt to be pulled out;
   wherein the defined length of the belt allowed to be pulled out is independent of the mass of the occupant.

2. The method as set forth in claim 1 wherein the defined length of the belt allowed to be pulled out is defined by an algebraic relation between the length and the detected vehicle acceleration.

3. The method as set forth in claim 1 wherein the step of detecting the vehicle acceleration comprises detecting the vehicle acceleration during selecting time intervals and wherein the step of defining a length of the belt greater than zero that is allowed to be pulled out comprises increasing the length of the belt allowed to be pulled out in response to a detected increase of the vehicle acceleration during the selected time interval.

4. The method as set forth in claim 1 wherein the length of the belt to be pulled out corresponds to a displacement of a reference body of known mass that is exposed to the same vehicle acceleration and is restrained by a known force.

5. An occupant restraint system for vehicles that provides, during an accident, forward displacement for an occupant within the occupant restraint system, comprising:
   at least one safety belt allowing a belt pullout greater than zero,
   a blocking device for blocking the belt pullout, and
   a release device acting on the blocking device for definedly enabling the belt pullout greater than zero,
   characterised by
   an acceleration detection unit which, in case of an accident, detects the vehicle acceleration and which, in dependence on the detected vehicle acceleration, determines a defined length of the belt greater than zero that is allowed to be pulled out and acts on the release device for enabling the determined length of the belt to be pulled out;
   wherein the defined length of the belt allowed to be pulled out is independent of the mass of the occupant.

6. An occupant restraint system as set forth in claim 5 characterised in that the acceleration detection unit has a reference mass (m) which is movable relative to the vehicle and which is displaceable out of its position against a predetermined force (F) and which upon a change in position against the predetermined force acts on the blocking unit as a release unit for enabling belt pullout.

7. An occupant restraint system as set forth in claim 6 characterised in that the reference mass (m) is adapted to act mechanically on the blocking device.

8. An occupant restraint system as set forth in claim 6 characterised in that the force (F) against which the reference mass (m) is displaceable is established by the formula $F = B\,m\,g$, wherein g is the acceleration due to gravity, m is the mass of the reference mass (m) and B is a freely selectable parameter.

9. An occupant restraint system as set forth in claim 8 characterised in that the parameter B is of the dimensionless value 60.

10. The occupant restraint system as set forth in claim 6, wherein the predetermined force (F) is achieved by a spring.

11. The occupant restraint system as set forth in claim 5, wherein the blocking unit device and the release device are defined by a rack engageable with a gear, the rack and gear combination enabling belt pullout.

12. The occupant restraint system as set forth in claim 6, wherein the blocking device includes a rack, at least one gear coupled to a retraction reel, and a plurality of abutment pins having beveled surfaces blocking movement of the rack in a given direction, and the release device is defined by a reference body having a front end with an inclined surface, the inclined surface being beveled to cooperate with the beveled surfaces of the abutment pins.

13. The occupant restraint system as set forth in claim 12, wherein the acceleration of the reference mass transmits a force to the bevelled surface of one of the abutment pins when the vehicle acceleration exceeds a predetermined acceleration, thereby displacing the abutment pins and causing belt pullout.

* * * * *